`United States Patent Office`

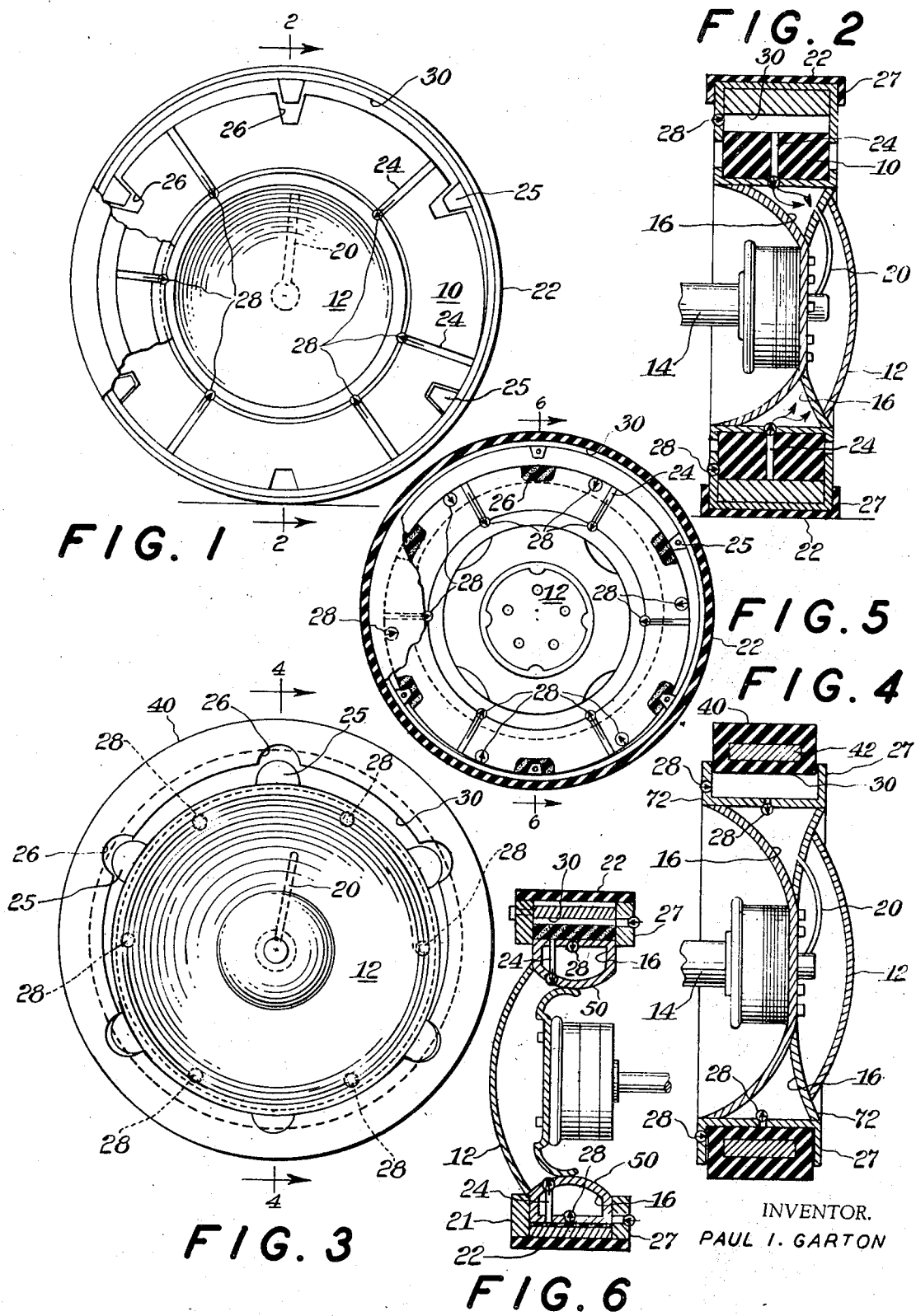

3,532,449
Patented Oct. 6, 1970

3,532,449
WHEEL
Paul I. Garton, 3112 9th St., Muskegon
Heights, Mich. 49444
Filed May 7, 1968, Ser. No. 727,286
Int. Cl. F04b *35/00;* F04c *17/00*
U.S. Cl. 418—167                                4 Claims

ABSTRACT OF THE DISCLOSURE

Wheel apparatus for use on vehicles wherein the wheels are continuously pressurized with air drawn from outside of the wheels and pressurized air can be supplied from the apparatus (which thus acts as a pump) to supply air under pressure to the vehicle for use in air brakes or for supercharging the engine or for a variety of other purposes. Use of this wheel apparatus eliminates the need for spare tires, jacks and other tire changing equipment; and tires cannot go flat. Moreover my apparatus provides a cushion air ride.

SUMMARY OF THE INVENTION

My wheel apparatus is adapted to cooperate with a horizontal driving axle rotatable about its own axis. My apparatus includes first and second wheels. The axle may also be of the nondrive type. Also used on nondrive axles.

The first wheel lies in a vertical plane and is adapted to be rotated about its center of rotation by the axle. The first wheel has first means disposed along its outer periphery in spaced apart positions.

The second wheel is an annular wheel having an inner diameter larger than that of the outer diameter of the first wheel and is disposed circumferentially in a vertical plane about the first wheel eccentrically whereby the center of rotation of the second wheel is offset from that of the first wheel. The second wheel has second means disposed along its inner periphery in spaced apart positions. The first means can be a plurality of spaced apart recesses or extensions and the second means can be a like plurality of spaced apart extensions or recesses, each extension being successively moved into and out of engaging registration with the corresponding recess as the first wheel is rotated.

The outer periphery of the second wheel is adapted to engage the road or other surface at its lowest point. The separation between the two wheels is a minimum at this lowest point with the recess and extension thereat being in full registration. The separation between the wheels is a maximum at the highest point which is oppositely disposed from the lowest point, the recess and extension thereat being fully out of registration.

Means securing the wheels together forms an annular sealed chamber therebetween which extends between the outer periphery of the first wheel and the inner periphery of the second wheel, the separation between the two peripheries at the highest point being a maximum for the chamber and this separation between the peripheries at the lowest point is a minimum for example zero. The chamber is provided with an air inlet port which permits outside air to enter but not leave the chamber and a spaced apart air outlet port which permits air in the chamber to leave but not to enter.

As the wheels rotate, air is drawn into the chamber to provide an air cushion. The pressurized air can be discharged either to the atmosphere or to a hollow channel in the axle for use with other equipment in the vehicle as previously described. It also may be stored in annular hollow air chamber to act as back pressure.

BRIEF DESCRIPTION OF THE DRAWINGS

In the drawings:
FIG. 1 is a front view of one form of my invention;
FIG. 2 is a cross sectional view through 2—2 in FIG. 1;
FIG. 3 is a front view of another form of my invention;
FIG. 4 is a view through 4—4 in FIG. 3;
FIG. 5 is a front view of still another form of my invention; and
FIG. 6 is a view through 6—6 in FIG. 5.

DETAILED DESCRIPTION OF PREFERRED EMBODIMENTS

Referring now to FIGS. 1–2, a hard rubber inner wheel 10 forms a first wheel rotatable about its center of rotation in a vertical plane by horizontal driving axle 14 having a hollow bore or channel extending therethrough and has a hub cap 12.

An annular hollow air chamber 16 is connected by feed tube 20, to the channel in the axle. Air intake tubes 24 extend radially through tire 10 from the outer periphery into chamber 16 and have one way check valves which conduct air into chamber 16 but prevent the flow of air in the reverse direction.

An outside hard rubber tire 22 bonded to metal is circumferentially disposed in a vertical plane about tire 10 in an eccentric manner with its center of rotation offset from that of the first wheel.

The inner surface or periphery of the tire 22 is larger in diameter than the outer diameter of the tire 10 and has a plurality of spaced apart inner radially extending metal blocks 25 movable into and out of engaging registration with corresponding spaced apart radially inwardly extending pockets 26 to seal off air to bottom of wheel. Tire 22 has a removable flange 27.

The surface of the inside of the channel 30 is larger than tire 10 to allow space for air cushions with the spacing between tires being a minimum (zero) at the lowest point on tire 22 which contacts the road with the extension and recess thereat being in full engaging registration. This spacing is a maximum at the highest point in the cover (oppositely disposed with respect to the lowest point) with the extension and recess thereat being out of registration. It identifies the part of the channel that the rubber 22 is attached to.

As the wheels rotate, air is drawn throught ports into space 30 and is discharged through tubes 24 into chamber 16 and thereout through tube 20 into the channel of the axle for the uses previously described.

In FIGS. 3 and 4, the wheel 72 is enlarged to serve itself as the first wheel, tire 10 in FIGS. 1 and 2 being eliminated, and the cover being replaced by a tire 40 with inner core 42. The operation is as described above. Check valves are shown at 28.

In FIGS. 5 and 6, the rim has a hollow annular section 50 which serves as the periphery and defines chamber 16. A casing 21 with cover 22 functions therewith in the manner previously indicated whereby air is drawn into space 30 and is expelled through check valves 28 into chamber.

In FIGS. 5 and 6, tube 20 is eliminated. Air is not passed through the axle. This arrangement can be used in conventional vehicles.

Tube 24 serves to draw in outside air from a position at which this air is clear. Hub caps 12 are shown in all drawings.

While I have described my invention with particular reference to the drawings, my protection is to be limited only by the terms of the claims which follow.

Having thus described my invention, I claim as new and desire to secure by Letters Patent:

1. Wheel apparatus adapted to cooperate with a horizontal axle rotatable about its own axis, said apparatus comprising:

a first wheel lying in a vertical plane and adapted to be rotated about its center of rotation by said axle, said first wheel having first means disposed along its outer periphery in spaced apart position;

a second annular wheel of larger diameter than said first wheel and having inner and outer peripheries, the inner periphery of the second wheel being larger in diameter than the outer periphery of the first wheel and having second means disposed therealong in spaced apart positions, said second wheel being disposed in a vertical plane about the first wheel so that corresponding ones of the first means and second means can be successively moved into and out of registration with each other as the first wheel is rotated, the outer periphery of the second wheel being adapted to engage the road or other surface at its lowest point, the separation between the two wheels being a minimum in the region of said lowest point with the first and second means at the lowest point being in full registration, the separation between said wheels being a maximum at the highest point which is oppositely disposed from the lowest point, the first and second means at the highest point being fully out of registration.

and means securing said wheels together to form an annular sealed chamber therebetween which extends between the outer periphery of the first wheel and the inner periphery of the second wheel, the separation between said peripheries at the lowest point being minimum for the chamber, the separation between said peripheries at the highest point being maximum for said chamber, said securing means having an air inlet port with a one way valve permitting air to enter but not to leave said chamber and a spaced apart air outlet port permitting air to leave but not to enter said chamber.

2. Apparatus as set forth in claim 1 wherein one of the first and second means is a plurality of spaced apart recesses and the other of said means is a plurality of spaced apart extensions, each extension being adapted for removable insertion in the corresponding recess.

3. Apparatus as set forth in claim 2 wherein said axle has an air delivery channel, said outlet port being coupled to said channel.

4. Apparatus as set forth in claim 3 wherein the first wheel has a second air chamber created by action of an eccentric into which air is drawn, the air being expelled into the first chamber until the air pressure is equalized.

References Cited

UNITED STATES PATENTS

| | | | |
|---|---|---|---|
| 1,341,846 | 6/1920 | Gollings | 103—121 |
| 1,622,593 | 3/1927 | Landon | 230—35 |

ROBERT M. WALKER, Primary Examiner

U.S. Cl. X.R.

152—419; 418—181